United States Patent [19]

Ludwig

[11] Patent Number: 5,449,524
[45] Date of Patent: Sep. 12, 1995

[54] DIFFERENTIAL INJECTION OF POULTRY

[75] Inventor: Wolfgang Ludwig, Highland, N.Y.

[73] Assignee: WTI, Inc., Highland, N.Y.

[21] Appl. No.: 343,371

[22] Filed: Nov. 22, 1994

[51] Int. Cl.⁶ ............................................. A23I 1/315
[52] U.S. Cl. .................................. 426/281; 426/644
[58] Field of Search .................. 426/281, 644; 99/532, 99/533

[56] References Cited

U.S. PATENT DOCUMENTS

| | | | |
|---|---|---|---|
| 2,709,658 | 5/1955 | Buchanan | 426/281 |
| 3,399,063 | 8/1968 | Schwall et al. | 426/281 |
| 3,511,164 | 5/1970 | Strandine . | |
| 3,528,820 | 9/1970 | Schwall et al. | 426/281 |
| 3,556,809 | 1/1971 | Strandine . | |
| 3,682,087 | 8/1972 | Panek . | |
| 3,754,302 | 8/1973 | Blair . | |
| 3,850,090 | 11/1974 | Walters | 99/533 |
| 3,946,117 | 3/1976 | Blair | 426/281 |
| 4,074,389 | 2/1978 | Blair | 99/533 |

FOREIGN PATENT DOCUMENTS

| | | | |
|---|---|---|---|
| 0297592 | 1/1989 | European Pat. Off. | 426/281 |
| 2030841 | 1/1980 | United Kingdom | 426/644 |
| 1576124 | 7/1990 | U.S.S.R. | 426/281 |

*Primary Examiner*—Arthur L. Corbin
*Attorney, Agent, or Firm*—Herbert Dubno

[57] ABSTRACT

Poultry carcasses, especially for rotisserie roasting, are differentially injected with the same or different marinates, especially to provide a greater proportion of the marinating solution in the breast portions than in the leg and other portions. The differential injection is accomplished by providing a greater flow cross section of the needles ill the breast portion than in the leg and other portion for greater numbers of needles at the breast portion than at the leg an other portion, and/or by pumping the solutions at a greater rate to the breast portions than to the leg and other portions.

14 Claims, 3 Drawing Sheets

DIFFERENTIAL INJECTION OF POULTRY

SPECIFICATION

1. Field f the Invention

My present invention relates to the treatment of poultry and, more particularly, to a method of treating poultry carcasses to improve the qualities thereof after cooking, especially roasting by rotisserie-type procedures.

2. Background of the Invention

It is known to inject poultry carcasses with solutions containing flavor-enhancers, preservatives, substances which promote tenderness, juiciness and fattiness, and texture modifiers so that the cooked product, upon eating, can be of improved quality.

For example, in my U.S. Pat. No. 5,302,406 and a copending application Ser. No. 08/190,652, I have described a method of inhibiting bacterial growth in meat by injecting, inter alia, a citrate solution into poultry.

In these systems, as well as in the following U.S. Pat. Nos. 3,850,090, 3,754,302, 3,682,087, 3,682,088, 3,556,809, 3,511,164, 4,074,389 and 3,946,117, aqueous solutions containing salts and vegetable oil emulsions may be injected into the meat tissue of a poultry carcass to substantial concentrations therein for a variety of purposes.

In cooking processes, for example, roasting on a rotating spit, i.e. in a rotisserie, however, it is frequently observed that the product is drier in certain regions and more moist in others, thereby giving the consumer the impression that the product is less well cooked and even raw in certain regions and more well cooked and perhaps even over-done in others.

In general, the breast meat of poultry tends to give the impression of being less moist and thigh, drumstick, (leg) and wing portions of a poultry carcass may give the impression of being more moist or even raw in some cases and undercooked in others.

By and large, the injection of poultry with needles has attempted to introduce the aqueous solution uniformly at all points at which the needle pierces the carcass. As a consequence, the needle arrangement was such that the percentage of the solution at injection would be expected to be the same at all points at which the injection takes place, i.e. throughout the meat of the carcass including the breast and other portions such as the thigh, drumsticks or leg and wings.

In practice, however, with a uniform array of needles piercing both the breast and the drumstick or leg portions, the proportion of the solution in the meat may not be the same at all locations because of the configuration of the carcass, the different depths to which the needles may penetrate the flesh, the different degrees to which the flesh at the various locations takes up the solution, etc. It is therefore not uncommon that, while the needle array is uniform, all the needles have the same flow cross section, the same solution pressure is applied to all needles and, indeed, every attempt is made to bring about a uniform solution contained in the meat of the breast and legs, the solution concentration may be greater in the leg regions than in the breast.

As a result, after the cooking process, the leg portions may appear to be excessively moist while the breast may appear to be excessively dry and the consumer may have the mistaken impression from the greater moisture content of the leg meat, that the leg portions of the carcass are undercooked. The problem is accentuated if the overall injection of the solution is increased to reduce dryness in the breast and efforts to obviate the problem by reducing the total proportion of the solution in the carcass can result in excessively dry breast meat.

I have now found that, surprisingly, the effect mentioned above may be a result of the attempt at uniformity with which such solutions have been injected into the poultry meat heretofore.

OBJECTS OF THE INVENTION

It is the principal object of the present invention, therefore, to provide an improved process for treating meat, especially to overcome the drawbacks of earlier processes with respect to after-cooked qualities of the product.

Another object is to provide an improved method of treating poultry carcasses so that, after cooking, especially after rotisserie-type roasting, all parts of the poultry carcass appear to be uniformly moist and to be equally well cooked.

Still another object of the invention is to provide an improved system for the injection of poultry carcasses, enabling the improved method to be practiced and producing poultry carcasses which can be cooked more uniformly.

SUMMARY OF THE INVENTION

I have found that it is possible to differentially inject poultry carcasses to thereby provide during the injection process, greater concentrations of the injected solution at certain regions of the poultry carcass and lesser concentrations of the injected solution at other portions so that, upon cooking, the meat of the carcass appears to have uniform moisture content throughout.

More particularly, the method of treating poultry carcasses having a breast and other portions including thigh portions, leg portions and wing portions connected to the breast, can comprise the steps of:

(a) injecting into meat of the breast a first aqueous solution of a material selected from the group which consists of flavor, tenderness, juiciness and fattiness enhancers in an amount sufficient to attain on injection a certain first concentration of the solution in the meat of the breast; and (b) injecting into meat of the other portions at least one second aqueous solution of a material selected from the group which consists of flavor, tenderness, juiciness and fattiness enhancers in an amount sufficient to attain on injection a certain second concentration of the second solution in the meat of the other portions different from the first concentration.

In general, I may inject the solution to a higher concentration in the breast region and to a lower concentration in those regions, e.g. the wing and the drumstick, so that when roasting is complete, the moisture content appears to be uniform throughout the meat of the carcass, thereby eliminating any appearance of underdoneness in the leg regions, for example, concomitantly with any appearance of overdoneness and excessive dryness of the breast.

While the invention is applicable to all cooking processes, I have found that it is particularly valuable for use in the preparation of poultry carcasses for roasting, especially spit roasting in a rotisserie-type environment and especially for such enterprises as mass-produce roasted chickens and roasted chicken parts by rotisserie-type processes.

According to a feature of the invention, the first and second solutions may be of identical composition. However they may also be different, thereby allowing, for example, larger amounts of oily substance to be injected into the breast where the enhancement of a fattiness characteristic may be desirable.

The solution can be injected simultaneously into the carcass at the two locations thereon or can be sequentially injected when, for example, the breast being injected first and followed by injection of leg portions or other parts to be injected to a degree different from that utilized in the breast.

The important factor, of course, is the quantity per unit of injected volume of the liquid introduced into the poultry carcass. The difference in such quantity per unit volume of the meat of the carcass may be achieved by injecting the two solutions into the carcass at different pressures or by injecting the single solution into the different regions under different pressures.

Alternatively, the solutions may be injected differentially by utilizing the same pressure at the breast and other regions but providing the cross sectional flow area of the needle so that such area is greater in the breast regions than in other portions.

In particular, the invention can be carried out by injecting the breast portions and the leg portions with separate arrays of needles either concurrently or in succession and with different flow cross sections per unit area of the needle portion of the carcass. While in principle it may be advantageous in some cases to provide a greater injection quantity per unit area (specific injection) in the leg meat than in the breast meat, as a practical matter, for rotisserie-cooked chickens, it will be the breast meat which will be injected with a greater quantity of the solution per unit area and the leg meat which will have a specific injection quantity which is lower.

The injection of the breast portion and leg portions can be effected with the same solution, e.g. through needles having a greater flow cross section in the breast region than in the leg region, particularly needles which in the breast region may have a greater number of passages per needle than the needles injecting the leg portions.

Alternatively, the breast portions and leg portions may be injected with different solutions, e.g. a solution injected into the breast region which may have a greater content of an oil or fat than the solution injected into the leg portions. In that case, the solutions may be circulated through respective pump and filter systems.

In general, therefore, with the method described, the first and second solutions can be injected simultaneously into the carcass or injected at different times, can be injected at the same pressures or at different pressures, can be injected with different numbers of needles per unit area of injection or with needles of the same injection density, i.e. numbers of needles per unit area, and with needles with greater flow cross section or the same cross section at the different regions.

Preferably the carcass is roasted after injection utilizing the principles of this invention on a spit and, if desired, the carcass after injection and prior to roasting can be stored for a time, preferably after chilling.

While any marinating-type of solution can be used for the present invention which has been found to be advantageous for injection of poultry carcasses before cooking, the usual solution for the purposes of the present invention can include one or more flavoring substances such as salt and, if desired, flavoring agents like dehydrated onion or garlic or extracts thereof, pepper, and other spices, at least one tenderness enhancer and-/or preservative, for example, one or more phosphates, and one or more juiciness or fattiness enhancers, usually a dehydrated chicken fat, a vegetable oil such as olive oil, butter or the like.

In the embodiment of the invention in which different solutions are injected into the different portions, the solution may have different compositions. In particular the oil or fat introduced into the breast portion can make up a greater proportion of the solution which is there injected.

A typical distribution of the needles, solution of pumping pressures and choice of other parameters should be such that the solution is injected into the leg portions to make up say 10% thereof, i.e. to a 10% concentration in the leg portion, and to a 15% concentration in the breast portions ±5% in each case.

A typical solution can include 0.9 to 1.5% salt (sodium chloride) up to 0.5% of a phosphate suitable for injection, for example sodium phosphate, up to 1% of spices and to 1% of fat or oil in the case of the leg portions and up to 3% of fat or oil in the case of the breast portions.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
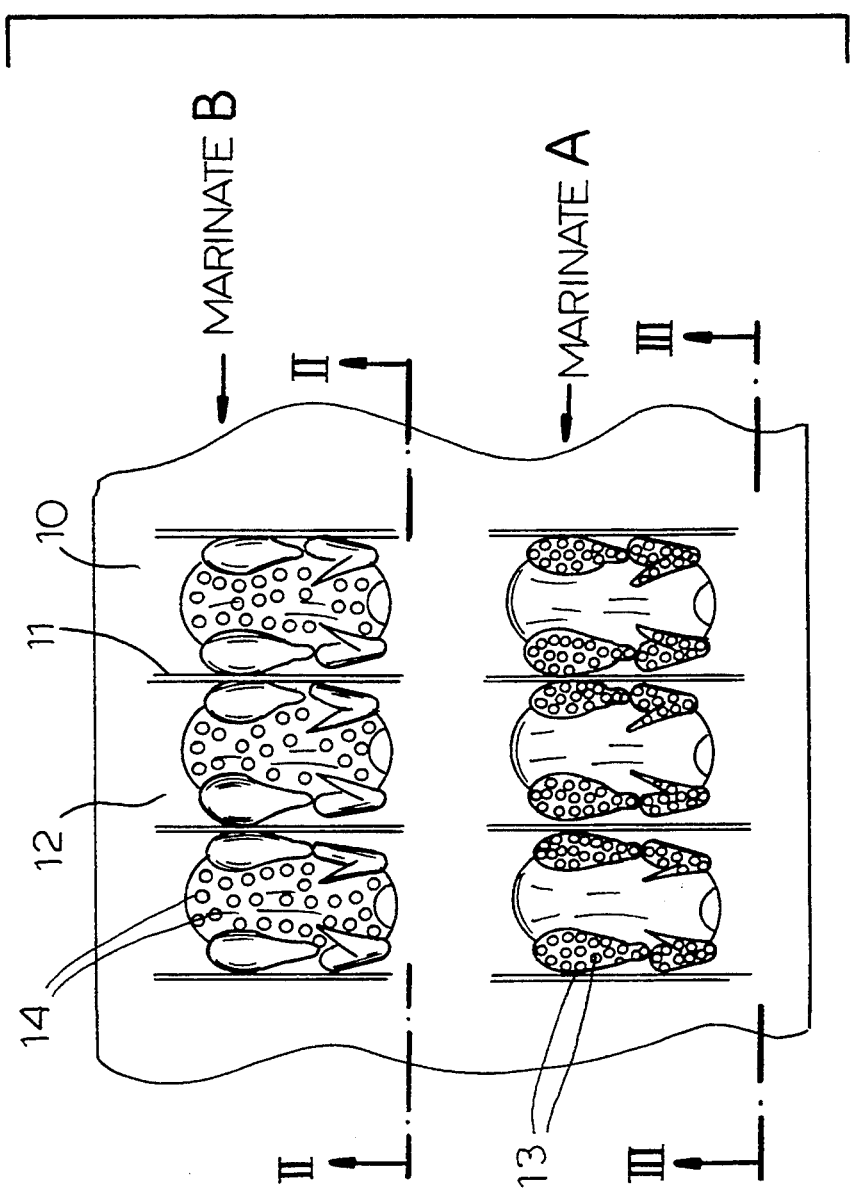
FIG. 1 is a plan view illustrating the principles of the invention in accordance with a first embodiment.

In FIG. 1 I have shown a transport belt 10 having partitions 11 separating compartments 12 from one another and each of the compartments having a respective poultry carcass therein oriented with the drumstick portions turned upwardly.

In a region A, a marinate A is injected into the carcass by needles represented at 13 and shown as dots in FIG. 1, disposed on a head which only injects the drumstick portions with that marinate A. As the carcass is moved further downstream to a region B, it is injected with a marinate B in the breast regions with needles 14 which differ from the needles used in injecting the leg portions, the two marinates being injected separately and being of different compositions.

Figure 3:
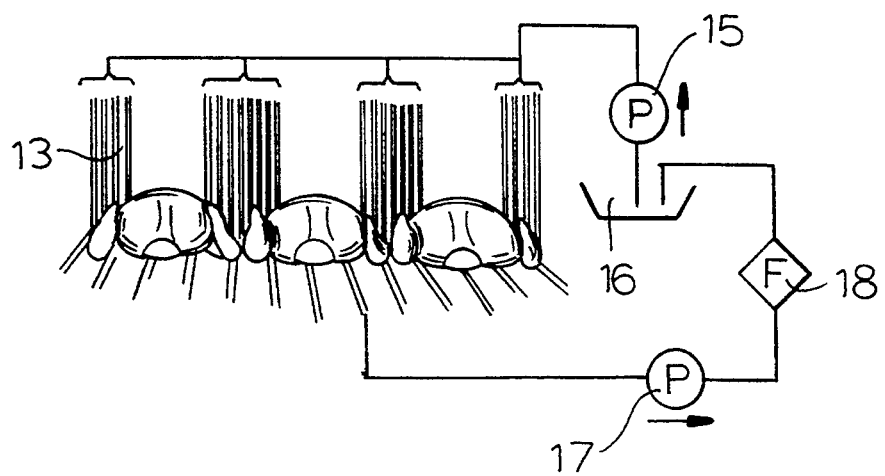
FIG. 3 is a cross sectional view taken along the line III—III of FIG. 1.

The marinate fed to the needles 13 (FIG. 3) are supplied by a pump 15 from a reservoir 16, the excess of the marinate being collected and returned by a pump 17 and a filter 18 to the vessel 16.

Correspondingly, the needles 14 receive the marinate B from a pump 25 and a reservoir 26, the excess being returned by a pump 27 through the filter 28 to the vessel 26.

EXAMPLE 1

Marinate A consists of an aqueous solution containing 1.2% by weight salt, 0.4% by weight of sodium phosphate, 0.8% of a mixture of garlic and onion extracts and 0.8% of dehydrated chicken fat which is dispersed in the solution.

The solution is injected with needles having a 3 mm outside diameter and a 1.5 mm inside diameter, laterally opening with four holes each of 1.2 mm diameter. The liquid is injected into the legs in an amount following the injection process of 8%.

Marinate B is injected into the breast portion in an amount of 15% and is identical to the marinate injected into the leg portion except that 3% of fat or oil is dispersed therein instead of 0.8%. Marinate B is injected through needles having a 3 mm outer diameter and a 1.5 mm inner diameter but having six lateral holes each with a 1.7 mm diameter. The needles for both the breast and leg portions can be spaced apart with the same spacings.

Alternatively needles with a 4 mm outer diameter and a 1.5 mm inner diameter with four or six lateral holes each of 1.2 mm to 1.7 mm diameter can be used for marinate B.

Figure 2:
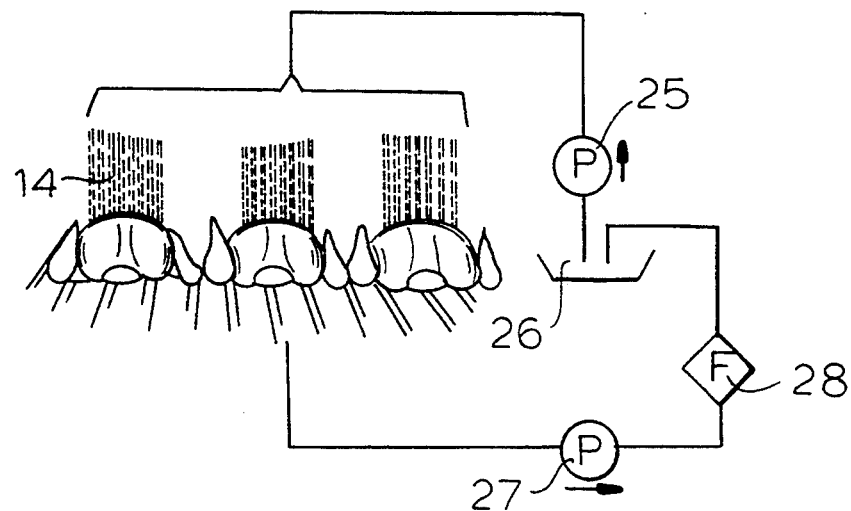
FIG. 2 is a cross sectional view taken along the line II—II of FIG. 1.
Figure 4:
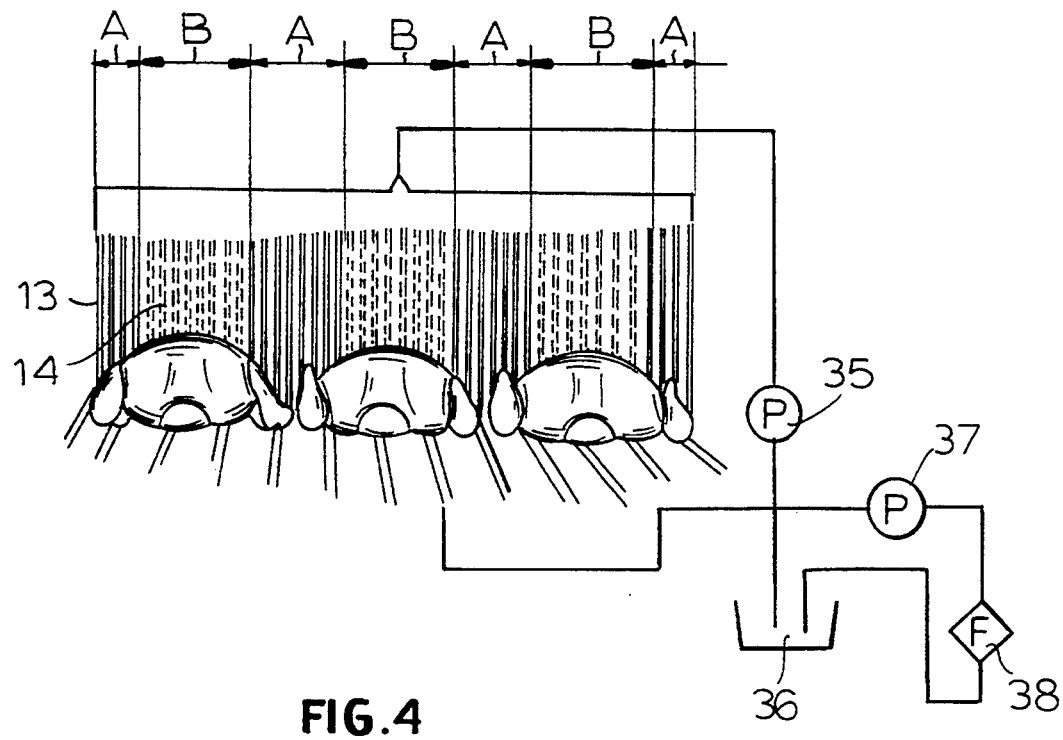
FIG. 4 is a view similar to FIGS. 2 and 3 illustrating another embodiment of the invention.
Figure 5:
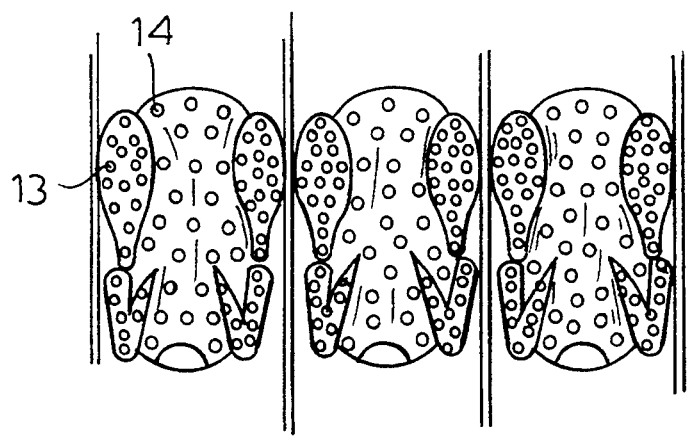
FIG. 5 is a plan view corresponding to FIG. 4.

In FIG. 4 I have shown an embodiment wherein all of the carcasses are injected with needles 13 and 14 in arrays A and B for respectively injecting the leg portions and the breast portions. Here all of the needles receive the same marinate from a vessel 36 via a pump 35, the cases being collected by a pump 37 and returned to the vessel 36 via the filter 38. In this embodiment, a single-head machine can be used as opposed to the double-head machine of FIGS. 1–3.

EXAMPLE 2

The marinate comprises an aqueous solution of 1.4% salt, 0.5% sodium phosphate, 1% spices (garlic and onion extracts) and 2% olive oil dispersed in the solution. In the regions A, the needles had a 3 mm outer diameter and 1.5 mm inner diameter laterally opening each through four lateral holes of 1.2 mm diameter.

The needles in regions B were of 3 mm outer diameter and 1.5 mm inner diameter each having six lateral holes opening laterally of 1.7 mm diameter.

I claim:

1. A method of treating a poultry carcass having a breast and other portions including thigh portions, leg portions and wing portions connected to the breast, comprising the steps of:
   (a) injecting into meat of said breast a first aqueous solution of a material selected from the group which consists of flavor, tenderness, juiciness and fattiness enhancers in an amount sufficient to attain a certain first concentration of said solution in the meat of the breast; and
   (b) injecting into meat of said other portions at least one second aqueous solution of a material selected from the group which consists of flavor, tenderness, juiciness and fattiness enhancers in an amount sufficient to attain a certain second concentration of said second solution in the meat of said other portions different from said first concentration.

2. The method defined in claim 1 wherein said first and second solutions are injected simultaneously into said carcass. C-529

3. The method defined in claim 1 wherein said first and second solutions are injected into said carcass at different times.

4. The method defined in claim 1 wherein said first and second solutions are injected into said carcass at different pressures.

5. The method defined in claim 1 wherein said first and second solutions are injected into said carcass at the same pressure 6. The method defined in claim 1 wherein said first and second solutions are injected into said carcass through needles of different cross sectional areas, the cross sectional areas of said needles injecting said first solution into said breast being greater than the cross sectional areas of said needles injecting said second solution into said other portions.

7. The method defined in claim 1 wherein said first and second solutions are injected into said carcass through needles of the same cross sectional area.

8. The method defined in claim 7 wherein said needles injecting said first solution have a lesser interneedle spacing than needles injecting said second solution into said other portions.

9. The method defined in claim 1 wherein said first solution is injected into said breast by an array of needles having a greater flow cross section for the first solution per unit area of the breast covered by said array than a flow cross section of another array of needles injecting said second solution into said other portions.

10. The method defined in claim 1, further comprising the step of thereafter roasting said carcass.

11. The method defined in claim 10 wherein said carcass is roasted while rotating same on a spit.

12. The method defined in claim 1, further comprising the step of thereafter chilling said carcass.

13. The method defined in claim 12, further comprising the step of thereafter storing said carcass.

14. The method defined in claim 1, further comprising the step of thereafter storing said carcass.

* * * * *